(12) United States Patent
Kuroki

(10) Patent No.: US 9,232,194 B2
(45) Date of Patent: Jan. 5, 2016

(54) IMAGING APPARATUS, DISPLAY METHOD, AND STORAGE MEDIUM FOR PRESENTING A CANDIDATE OBJECT INFORMATION TO A PHOTOGRAPHER

(71) Applicant: CANON KABUSHIKI KAISHA, Tokyo (JP)

(72) Inventor: Tsuyoshi Kuroki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 382 days.

(21) Appl. No.: 13/687,361

(22) Filed: Nov. 28, 2012

(65) Prior Publication Data
US 2013/0135464 A1  May 30, 2013

(30) Foreign Application Priority Data
Nov. 29, 2011 (JP) ................. 2011-260275

(51) Int. Cl.
| | |
|---|---|
| H04N 7/18 | (2006.01) |
| H04W 4/02 | (2009.01) |
| G06F 17/30 | (2006.01) |
| H04N 1/00 | (2006.01) |
| H04N 5/232 | (2006.01) |

(52) U.S. Cl.
CPC ............ *H04N 7/18* (2013.01); *G06F 17/30265* (2013.01); *H04N 1/00323* (2013.01); *H04N 5/23222* (2013.01); *H04W 4/023* (2013.01); *H04N 2201/0084* (2013.01)

(58) Field of Classification Search
CPC ............ H04N 1/0024; H04N 1/00244; H04N 21/25841; H04N 21/4532; H04N 21/6581
USPC ................. 701/438, 410, 431, 433, 425, 426; 348/14.02, 14.03, 333.01–333.12, 135, 348/143, 158
See application file for complete search history.

(56) References Cited

U.S. PATENT DOCUMENTS

| | | | | |
|---|---|---|---|---|
| 7,864,218 | B2* | 1/2011 | Kusaka et al. | 348/211.2 |
| 8,589,069 | B1* | 11/2013 | Lehman | 701/438 |
| 8,730,337 | B2* | 5/2014 | Inoue et al. | 348/211.5 |
| 2001/0048815 | A1 | 12/2001 | Nakajima | |
| 2002/0082773 | A1* | 6/2002 | Ikeuchi et al. | 701/211 |
| 2003/0146985 | A1* | 8/2003 | Miyagi et al. | 348/231.3 |
| 2003/0164882 | A1* | 9/2003 | Kondo et al. | 348/208.14 |
| 2006/0195475 | A1* | 8/2006 | Logan et al. | 707/104.1 |
| 2007/0091172 | A1* | 4/2007 | Lee | 348/113 |
| 2007/0110338 | A1* | 5/2007 | Snavely et al. | 382/305 |
| 2007/0132872 | A1* | 6/2007 | Sato et al. | 348/333.01 |
| 2007/0162942 | A1* | 7/2007 | Hamynen et al. | 725/105 |

(Continued)

FOREIGN PATENT DOCUMENTS

| | | |
|---|---|---|
| CN | 101873420 A | 10/2010 |
| JP | 2005-045398 A | 2/2005 |

(Continued)

*Primary Examiner* — Victor Kostak
(74) *Attorney, Agent, or Firm* — Canon U.S.A., Inc. IP Division

(57) ABSTRACT

An imaging apparatus includes an imaging unit, a position detection unit configured to detect position information of the imaging apparatus, an acquisition unit configured to acquire candidate object information indicating an object which a photographer may desire to capture an image thereof within a search range of position information based on the position information detected by the position detection unit, and a presenting unit configured to present the candidate object information to the photographer.

12 Claims, 16 Drawing Sheets

(56) References Cited

U.S. PATENT DOCUMENTS

| | | |
|---|---|---|
| 2008/0068486 A1* | 3/2008 | Kusaka .................... 348/333.02 |
| 2009/0048860 A1* | 2/2009 | Brotman et al. .................. 705/1 |
| 2009/0063047 A1* | 3/2009 | Ono ............................. 701/211 |
| 2009/0167919 A1* | 7/2009 | Anttila et al. ............ 348/333.02 |
| 2009/0195650 A1* | 8/2009 | Hanai et al. .................. 348/143 |
| 2010/0039505 A1* | 2/2010 | Inoue et al. ..................... 348/61 |
| 2010/0053371 A1* | 3/2010 | Karimoto .................... 348/231.3 |
| 2010/0130236 A1* | 5/2010 | Sivadas et al. ............. 455/456.6 |
| 2010/0149399 A1* | 6/2010 | Mukai et al. ............. 348/333.02 |
| 2010/0161658 A1* | 6/2010 | Hamynen et al. ............. 707/770 |
| 2011/0013018 A1* | 1/2011 | Leblond ....................... 348/143 |
| 2011/0029635 A1* | 2/2011 | Shkurko et al. ............... 709/217 |
| 2011/0164163 A1* | 7/2011 | Bilbrey et al. ........... 348/333.01 |
| 2011/0199479 A1* | 8/2011 | Waldman ..................... 348/116 |
| 2011/0273575 A1* | 11/2011 | Lee ............................ 348/222.1 |
| 2011/0282570 A1* | 11/2011 | Tanioka et al. ................ 701/200 |
| 2012/0052880 A1* | 3/2012 | Hymel et al. ............... 455/456.3 |
| 2012/0162481 A1* | 6/2012 | Kim et al. ................... 348/240.1 |
| 2012/0200743 A1* | 8/2012 | Blanchflower et al. ....... 348/239 |
| 2013/0027571 A1* | 1/2013 | Parulski ................... 348/207.11 |
| 2014/0289328 A1* | 9/2014 | El-Fishawy, Sani .......... 709/204 |

FOREIGN PATENT DOCUMENTS

| | | |
|---|---|---|
| JP | 2010-045435 A | 2/2010 |
| JP | 2010-045436 A | 2/2010 |
| JP | 2010-205226 A | 9/2010 |
| JP | 2011-010133 A | 1/2011 |
| JP | 2011-188054 A | 9/2011 |
| WO | 2011/136340 A1 | 11/2011 |

* cited by examiner

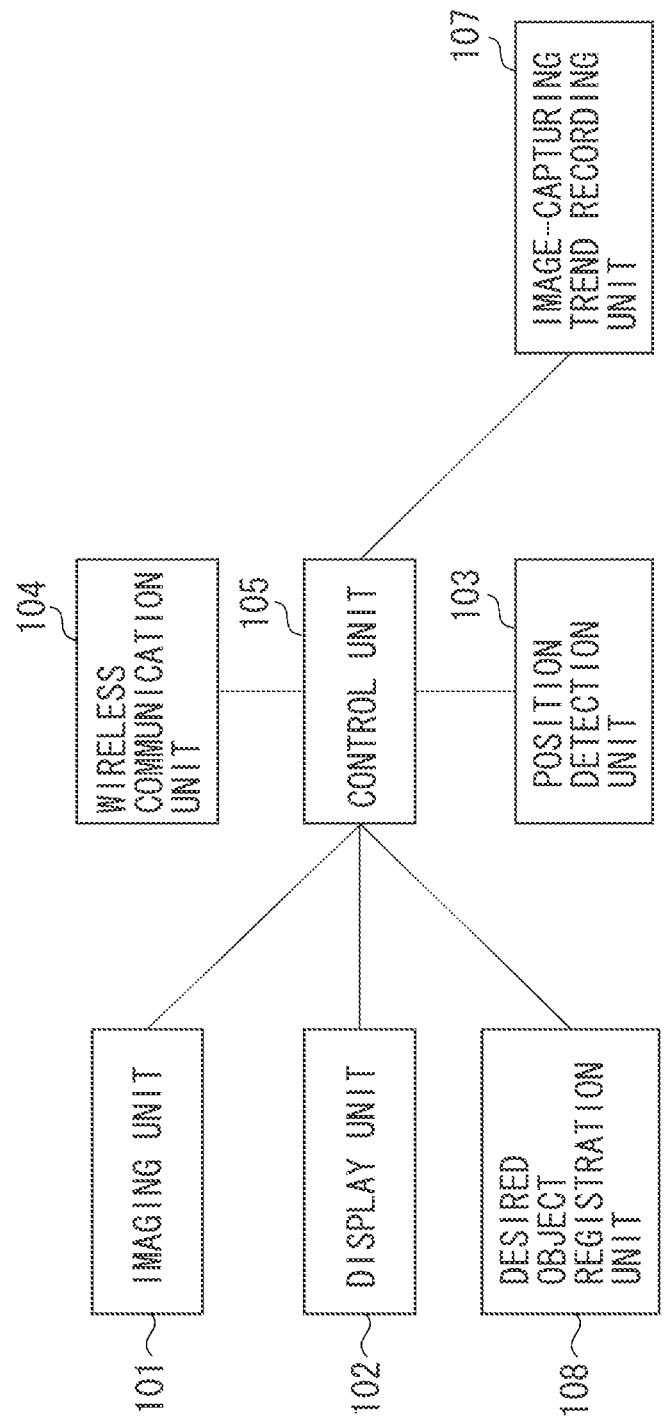

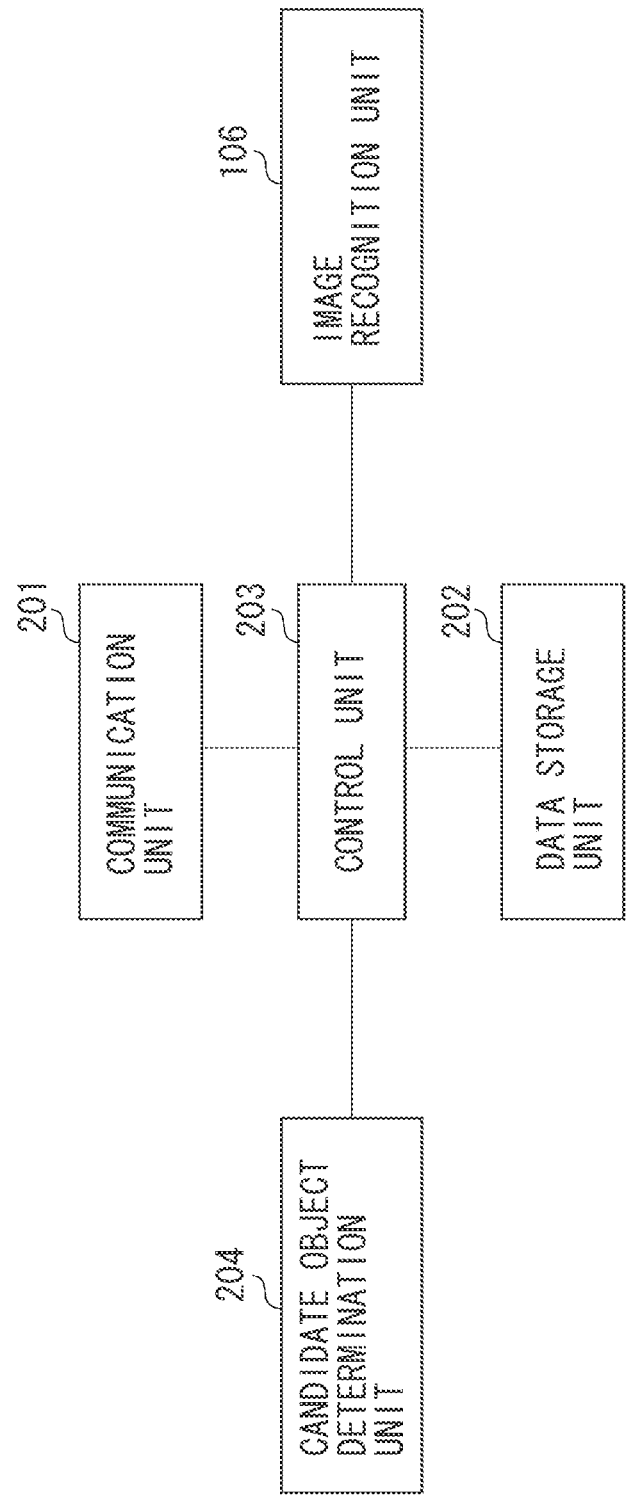

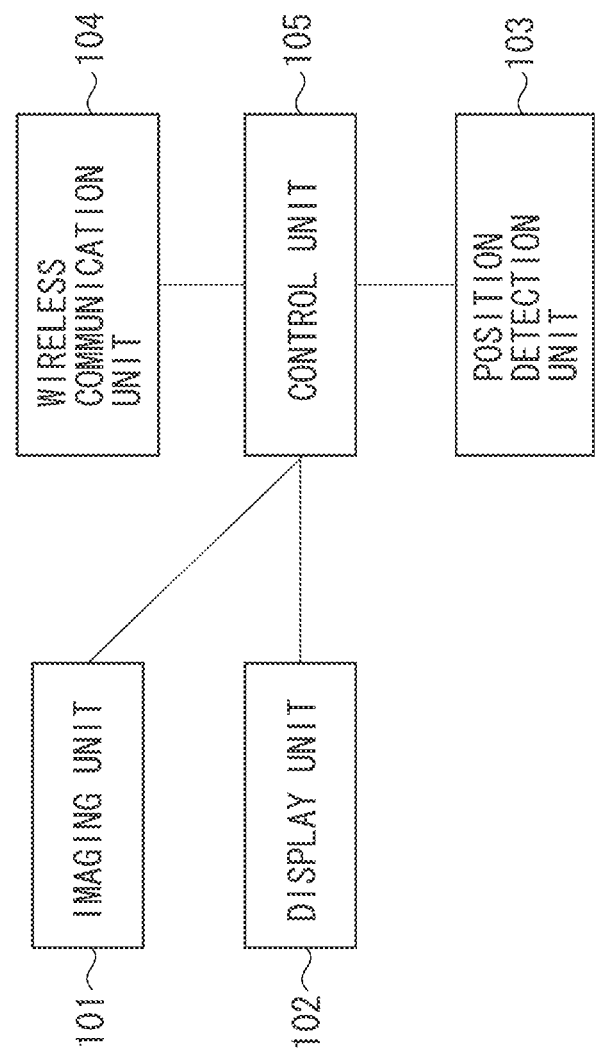

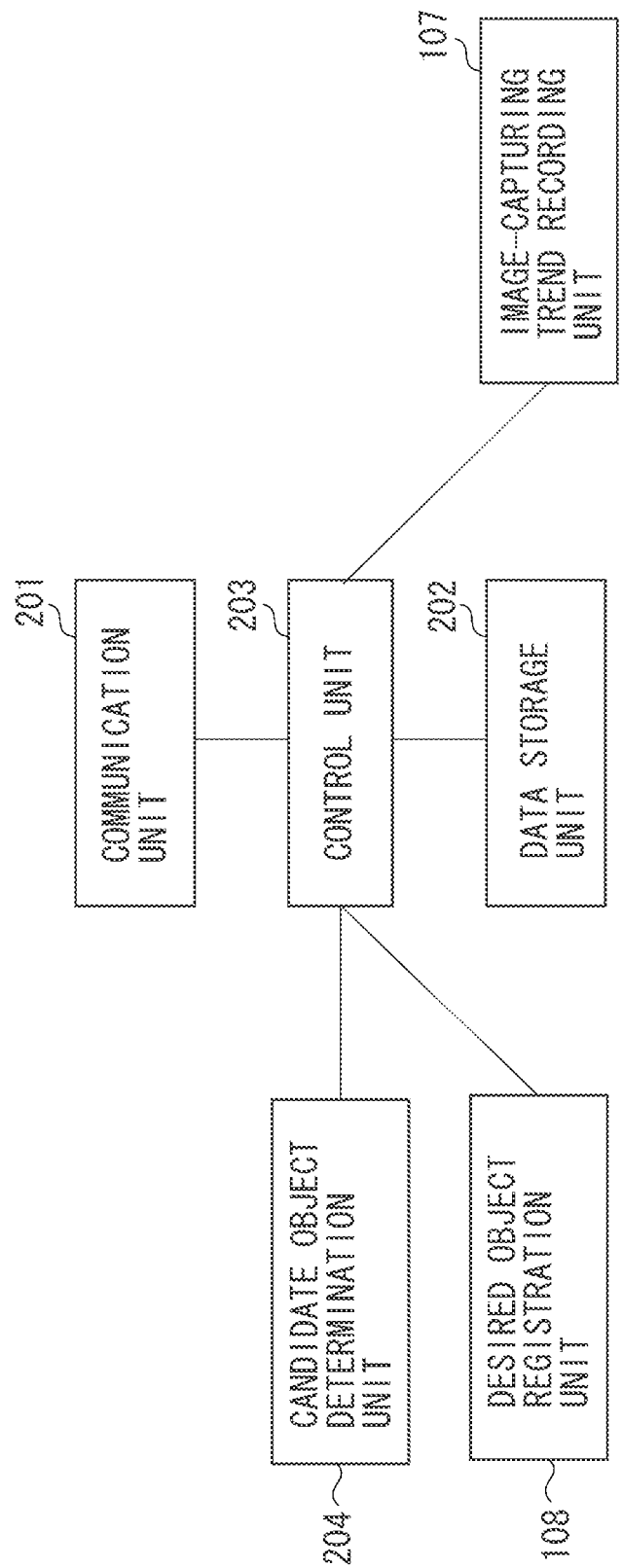

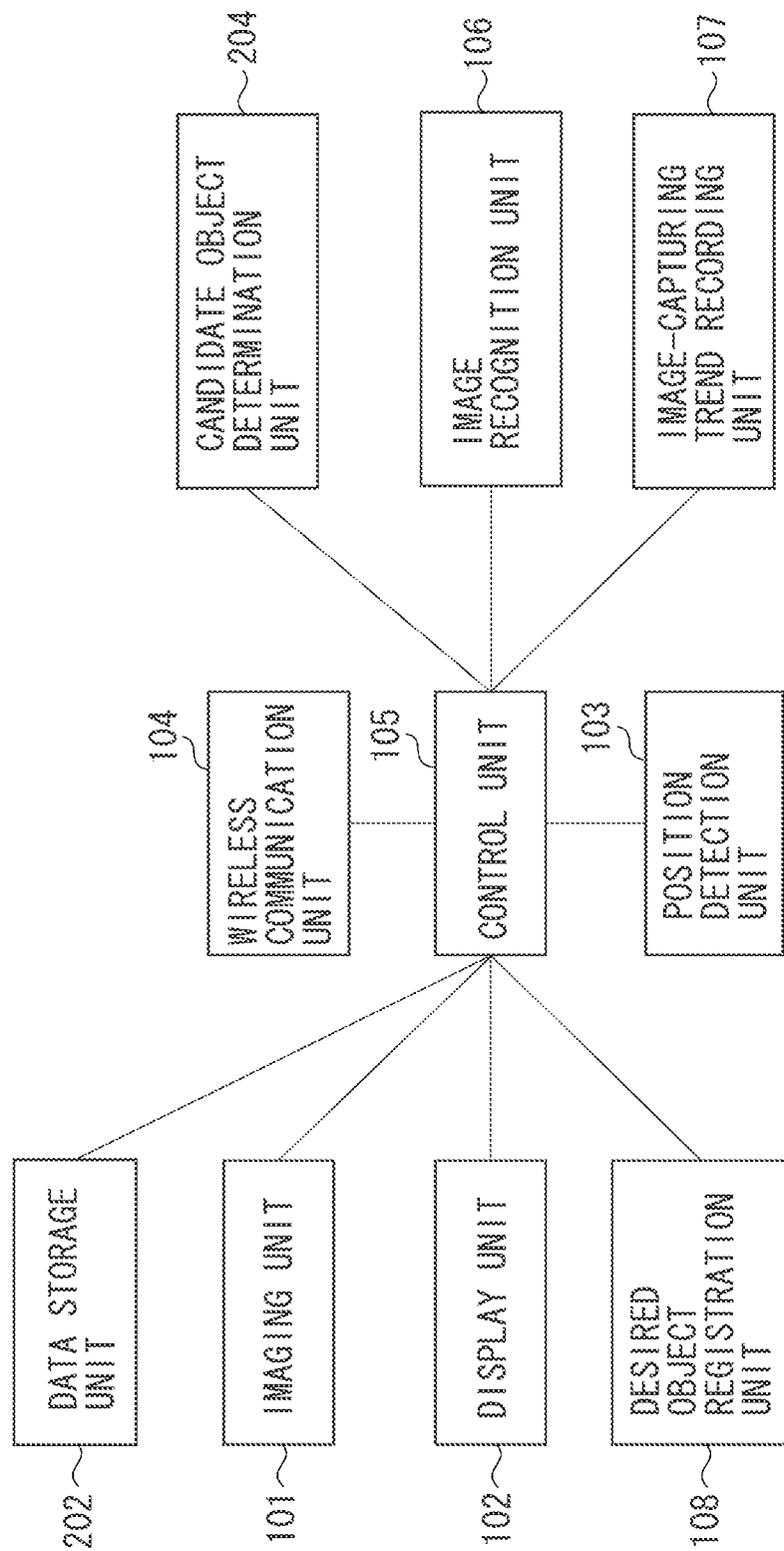

IMAGING APPARATUS, DISPLAY METHOD, AND STORAGE MEDIUM FOR PRESENTING A CANDIDATE OBJECT INFORMATION TO A PHOTOGRAPHER

BACKGROUND OF THE INVENTION

1. Field of the Invention

The present invention relates to an imaging apparatus, a display method, and a storage medium.

2. Description of the Related Art

A photo-sharing service in which photographers are allowed to register images captured by using camera-equipped mobile phones and digital cameras on a Web service on an internet and the general public can view the registered images therefrom, has been widely spread (see, Y. Zheng, Z. Zha and T. Chua "Research and applications on georeferenced multimedia: a survey", Multimedia Tools and Applications, Volume 51, Number 1, January 2011). Some of the photo-sharing services have a function of displaying a thumbnail of an image on a map with reference to position information embedded in the image.

As described above, by allowing a viewer to view the images of an unspecified number of photographers who posted the images on the map, the viewer can know at which point on the map images are frequently captured and thus can know, for example, what kinds of photo spots exist around the viewer himself.

In many photo-sharing services, text information, e.g., tags and memos, can be related to an image. Therefore, the photographers and the viewers can write what is captured in the image by using the text information.

The viewers can know which position on the map is popular among the photographers according to the Web service in which the viewers can see the images posted on the map. However, a spot popular in the service is often a typical noted place and historic scene in which everybody tends to be interested. For example, in a case where a photographer has a special preference in capturing images of, for example, railways and specific animals such as kingfishers, the photographer cannot find out an image-capturing spot which matches the photographer's preference even when the photographer uses the above described Web service.

SUMMARY OF THE INVENTION

The present invention is directed to an imaging apparatus capable of presenting a new target object existing around a photographer to the photographer, and a display method and a storage medium thereof.

According to another aspect of the present invention, an imaging apparatus includes an image capture unit, a position detection unit configured to detect position information of the imaging apparatus, an acquisition unit configured to acquire candidate object information indicating an object which a photographer may wish to capture an image thereof within a search range of position information based on the position information detected by the position detection unit, and a presenting unit configured to present the candidate object information to the photographer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10A is a block diagram illustrating a functional configuration of an imaging apparatus according to a second exemplary embodiment. FIG. 10B is a block diagram illustrating a functional configuration of an information sharing server according to the second exemplary embodiment.

FIG. 11A illustrates a functional configuration of an imaging apparatus according to a third exemplary embodiment.

FIG. 12B is a block diagram illustrating a functional configuration of an information sharing server according to the fourth exemplary embodiment.

FIG. 13 is a block diagram illustrating a functional configuration of an imaging apparatus according to a fifth exemplary embodiment.

DESCRIPTION OF THE EMBODIMENTS

Various exemplary embodiments, features, and aspects of the invention will be described in detail below with reference to the drawings.

A first exemplary embodiment of the present invention is directed to an imaging apparatus capable of presenting a target object existing around a photographer to the photographer by using a display screen. According to the present exemplary embodiment, in a case where the photographer sets his imaging apparatus to such a mode that the photographer can receive a suggestion of an adjacent target object while the photographer carries the imaging apparatus with him, the photographer can receive information notifying the target object existing around the photographer himself and can confirm the target object on a display screen of the imaging apparatus.

The imaging apparatus of the present exemplary embodiment is equipped with a Global Positioning System (GPS) having a function of recording position information in captured image data by measuring a position of the imaging apparatus itself, and has a wireless communication function capable of transmitting the captured image data to the information sharing server. The information sharing server receives a plurality of pieces of image data from a plurality of imaging apparatuses of a plurality of photographers. The information sharing server transmits information of a candidate of an adjacent target object to the imaging apparatus in a manner as described below.

Figure 1:
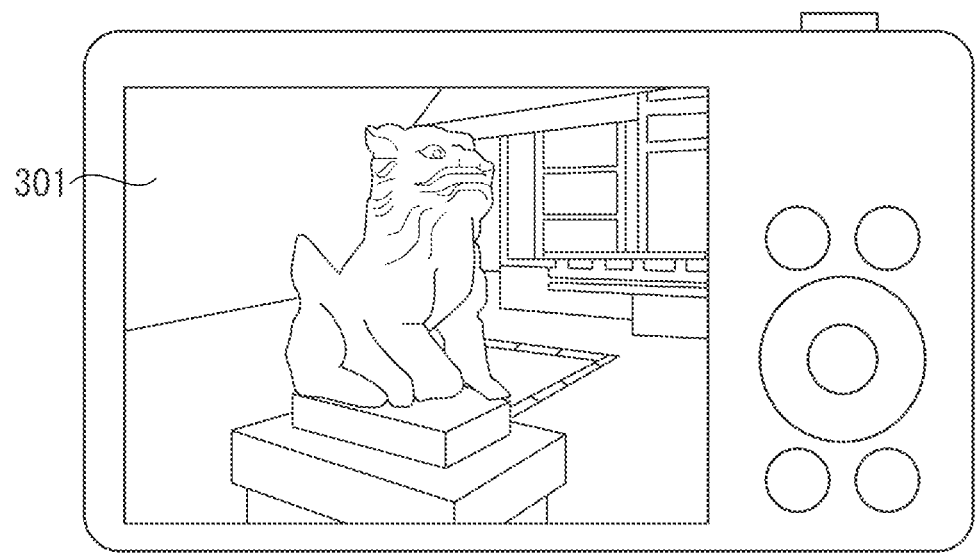
FIG. 1 illustrates an appearance of an imaging apparatus.

FIG. 1 illustrates an appearance of an imaging apparatus according to the present exemplary embodiment. In the present exemplary embodiment, the imaging apparatus is, for example, a compact digital camera. In an example of FIG. 1, the compact digital camera includes a below described liquid crystal display 906 with a display screen 301 attached thereto.

Figure 2:
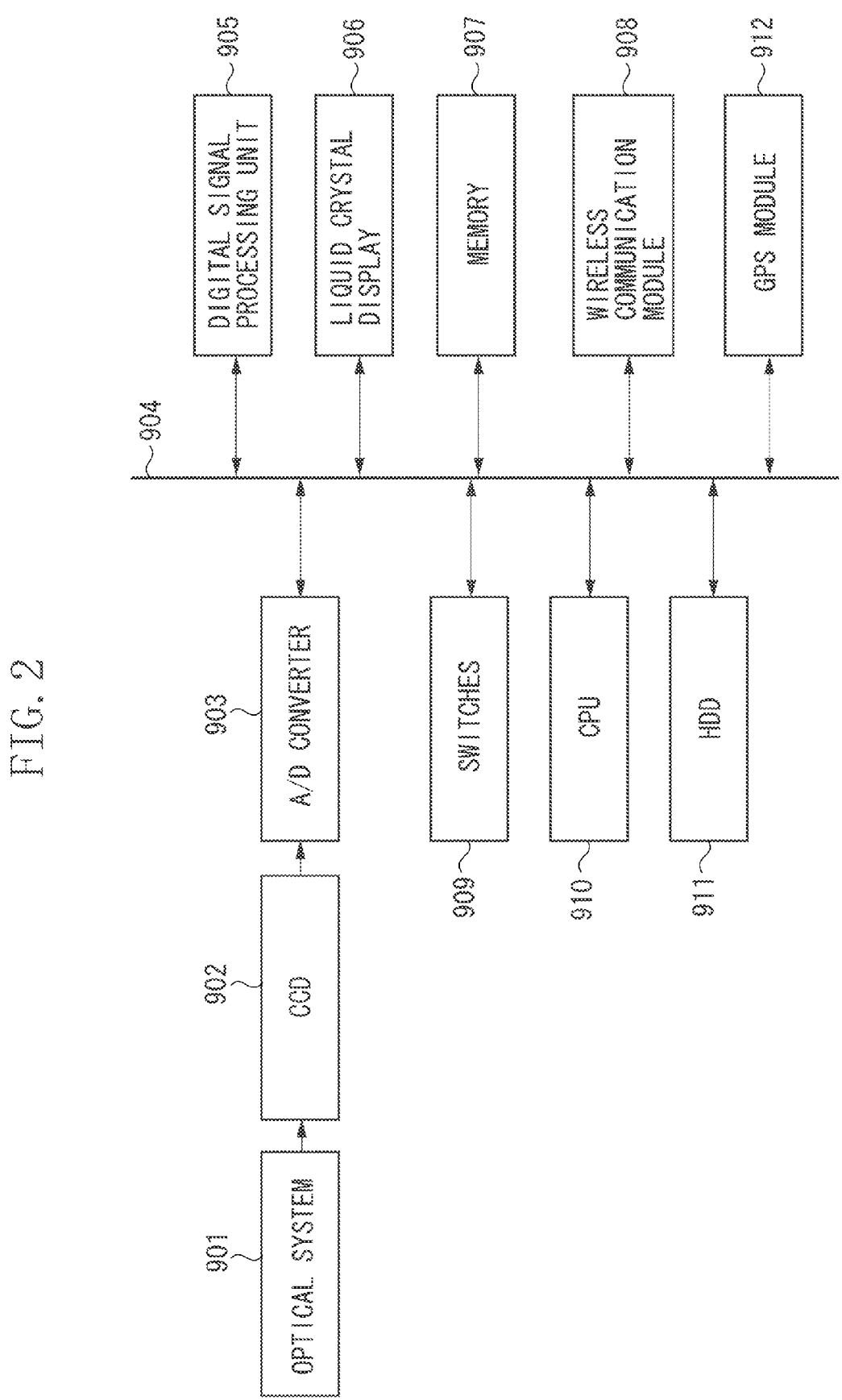
FIG. 2 is a block diagram illustrating a hardware configuration of the imaging apparatus.

FIG. 2 is a schematic view illustrating a hardware configuration of the imaging apparatus according to the present exemplary embodiment. In FIG. 2, an optical system 901 includes an optical zoom lens and a shutter. A charge coupled device (CCD) 902 converts an object image into an electric image signal. An analogue-to-digital (A/D) converter 903 converts an output from the CCD 902 into a digital signal.

A digital signal processing unit 905 performs predetermined signal processing on the image signal from the A/D converter 903. The liquid crystal display 906 is a thin visual display device. A memory 907 temporarily stores an image and reads/writes various types of data required in the present imaging apparatus. A wireless communication module 908 transmits data from the imaging apparatus via a wireless transmission network and causes the received data to flow to a data bus 904.

Switches 909 include switches and buttons mounted on an imaging apparatus body to accept the photographer's operation. A central processing unit (CPU) 910 controls the entire imaging apparatus. A hard disk drive (HDD) 911 records captured images. A GPS module 912 has a GPS positioning function capable of calculating latitude data, longitude data, and height data which represent a currently existing position of the imaging apparatus. The liquid crystal display 906 is a mere example of the display.

A whole or a part of the functional configuration and a whole or a part of processing of steps of each flow chart of the imaging apparatus are realized by the CPU 910 executing processing according to a program stored in the memory 907 or the HDD 911. Each of the components from the A/D converter 903 through the HDD 911 is connected to a data bus 904.

The information sharing server has a hardware configuration including, for example, a CPU and a HDD. A whole or a part of the functional configuration of the information sharing server and a whole or a part of processing of steps of each flow chart of the information sharing server are realized by the CPU executing processing according to a program stored in the HDD.

Figure 3:
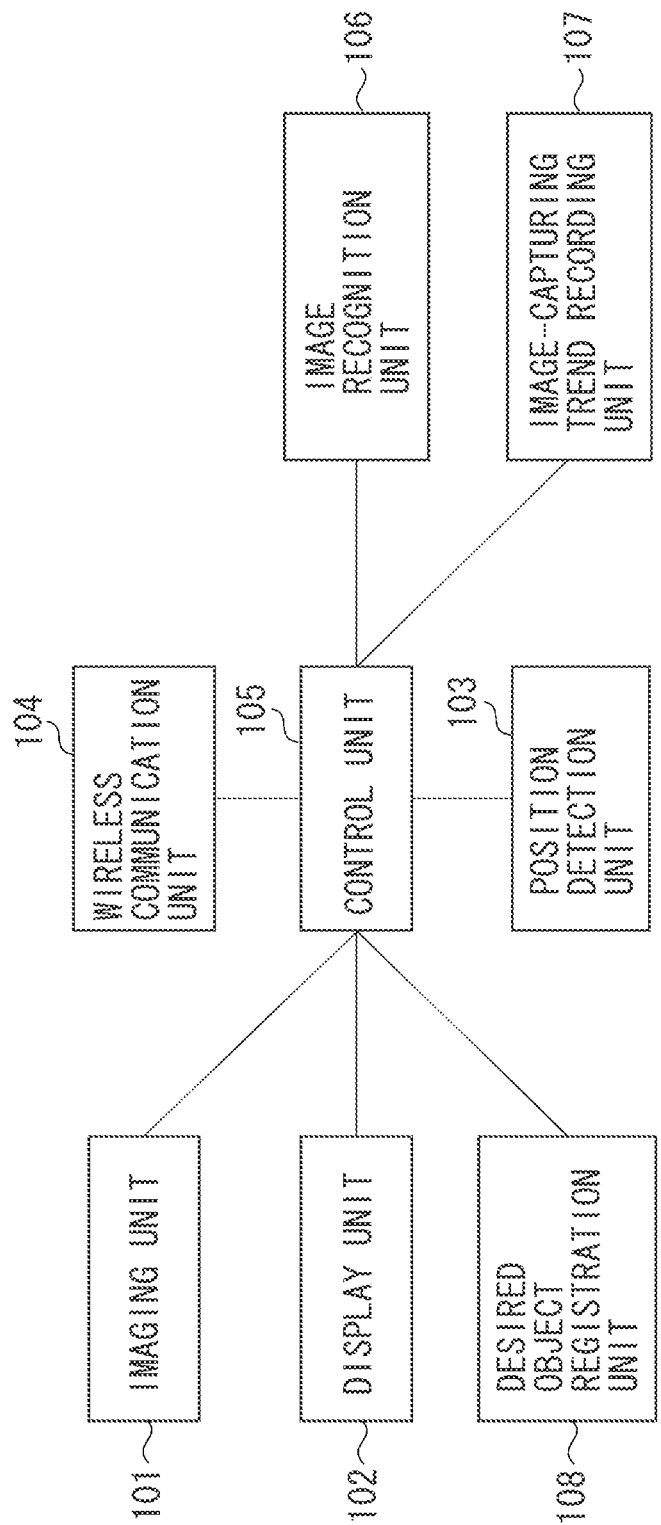
FIG. 3 is a block diagram illustrating a functional configuration of an imaging apparatus according to a first exemplary embodiment of the present invention.

FIG. 3 is a block diagram illustrating a functional configuration of the imaging apparatus according to the present exemplary embodiment. The functional configuration of the imaging apparatus according to the present exemplary embodiment is described below with reference to the drawings attached hereto.

An imaging unit 101 includes the optical system 901, the CCD 902, the A/D converter 903, and the digital signal processing unit 905. The imaging unit 101 outputs an image signal to a control unit 105. A display unit 102 displays a captured image and candidate object information. The display unit 102 includes the liquid crystal display 906.

A position detection unit 103 detects information as to where the imaging apparatus is positioned on the earth. The position detection unit 103 includes a GPS module 912 built in the imaging apparatus. A wireless communication unit 104 transmits captured image data to the information sharing server via a public wireless network. The wireless communication unit 104 receives data from the information sharing server. The wireless communication unit 104 includes the wireless communication module 908.

The control unit 105 performs various kinds of control processing within the imaging apparatus. The control unit 105 includes the CPU 910. An image recognition unit 106 recognizes an object in an image captured by the imaging unit 101. The image recognition unit 106 includes the CPU 910.

An image-capturing trend recording unit 107 records an image-capturing trend of objects which the photographer captures the images thereof. The image-capturing trend recording unit 107 includes the CPU 910. The image-capturing trend is recorded in the HDD 911. A desired object registration unit 108 registers an object which the photographer wishes to capture an image thereof (hereinafter referred to as "desired object" or "wished object"). The desired object registration unit 108 includes the CPU 910 and records the desired object in the HDD 911.

Hereinabove, the configuration of the imaging apparatus according to the present exemplary embodiment is described with reference to the drawings attached hereto.

Figure 4:
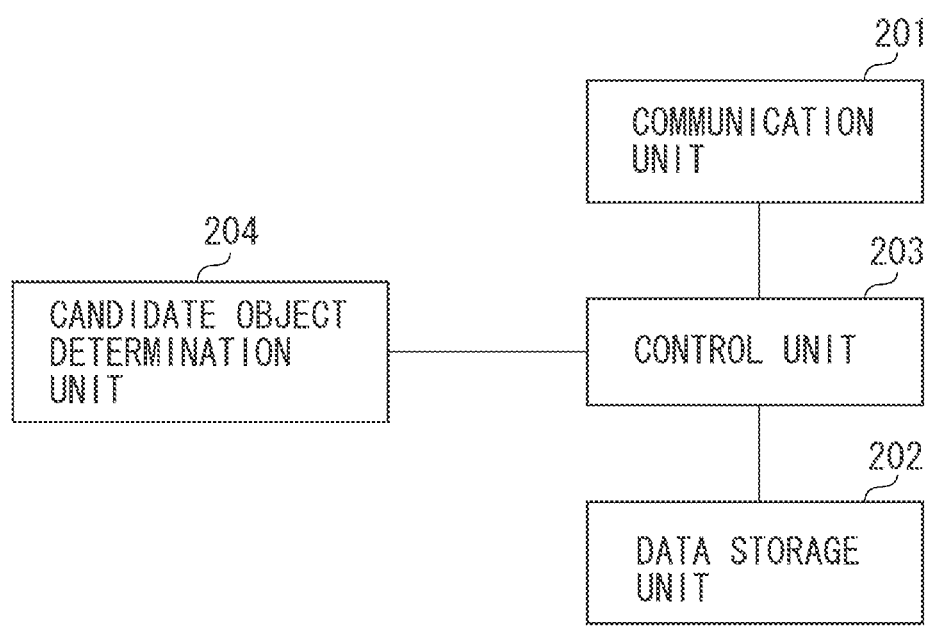
FIG. 4 is a block diagram illustrating a functional configuration of an information sharing server according to the first exemplary embodiment.

FIG. 4 illustrates a configuration of the information sharing server according to the present exemplary embodiment. The configuration of the information sharing server according to the present exemplary embodiment is described below with reference to FIG. 4. The information sharing sever in the present exemplary embodiment includes a general computer.

A communication unit 201 receives the image data transmitted to an internet from a plurality of imaging apparatuses via the public wireless network. A data storage unit 202 stores the image data received by the communication unit 201. The data storage unit 202 contains map information therein. The data storage unit 202 includes the CPU and stores data in the HDD.

A control unit 203 performs various kinds of control of the information sharing server. The control unit 203 includes the CPU of the information sharing server. A candidate object determination unit 204 determines a candidate object existing around the imaging apparatus based on the desired object information and the current position information transmitted from the imaging apparatus with respect to the imaging apparatus connected to the information sharing server via the wireless communication network. The candidate object determination unit 204 includes the CPU.

Hereinabove, the configuration of the information sharing server in the present exemplary embodiment is described with reference to FIG. 4.

Figure 5:
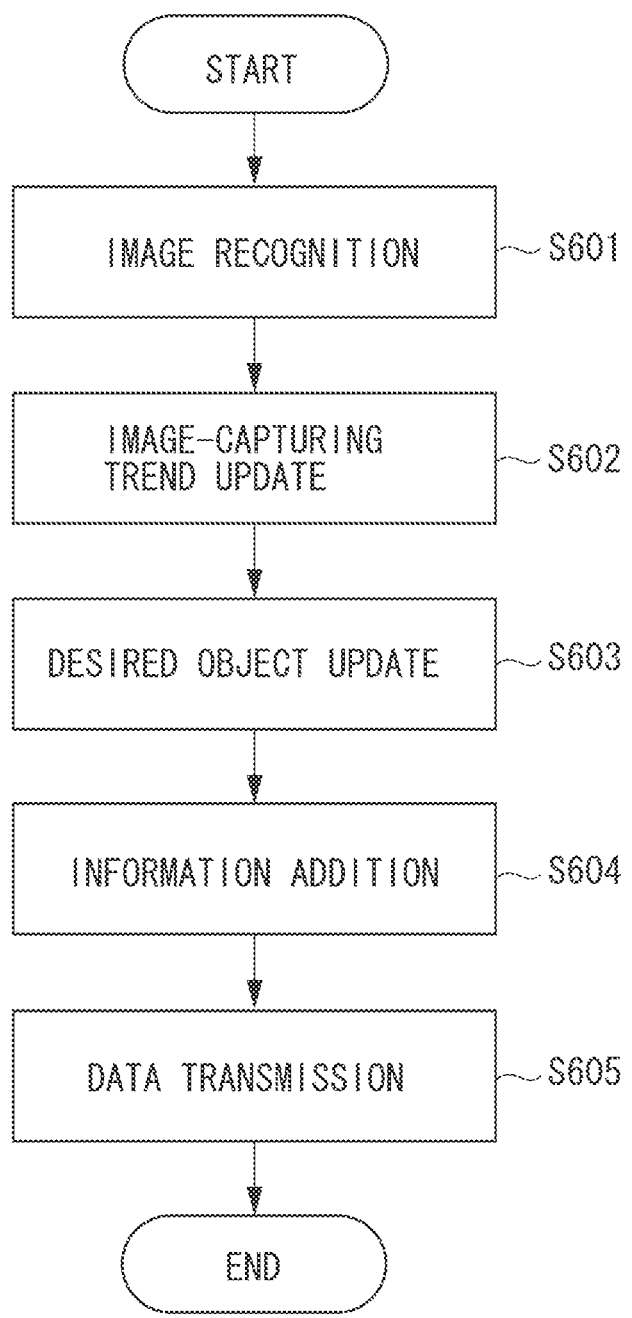
FIG. 5 is a flow chart illustrating a flow of processing automatically performed by the imaging apparatus after an image is captured by a photographer.

FIG. 5 is a flow chart illustrating a flow of processing automatically performed by the imaging apparatus in the present exemplary embodiment after the photographer captures an image. The flow of the processing performed by the imaging apparatus after the image capturing processing is described below with reference to FIG. 5.

In step S601, image recognition processing is performed with respect to the captured image when the photographer captures an image. The image recognition unit 106 performs the image recognition processing by a method as described in Japanese Patent Application Laid-open No. 2011-86261 to thereby determine what kind of person, object, building, animal, or plant is contained in the captured image. After completion of the processing in step S601, the processing proceeds to step S602.

In step S602, the image-capturing trend recording unit 107 updates the image-capturing trend (i.e., image-capturing trend information) of the photographer who is using the imaging apparatus. In this process, the result recognized by the image recognition unit 106 is stored, and a history representing what kinds of images of "objects" are captured in the imaging apparatus by the photographer is recorded. The history is recorded in the form of a frequency distribution for each image-captured "object". The frequency distribution can be displayed on the liquid crystal display 906 of the imaging apparatus according to an operation of the photographer.

Figure 6:
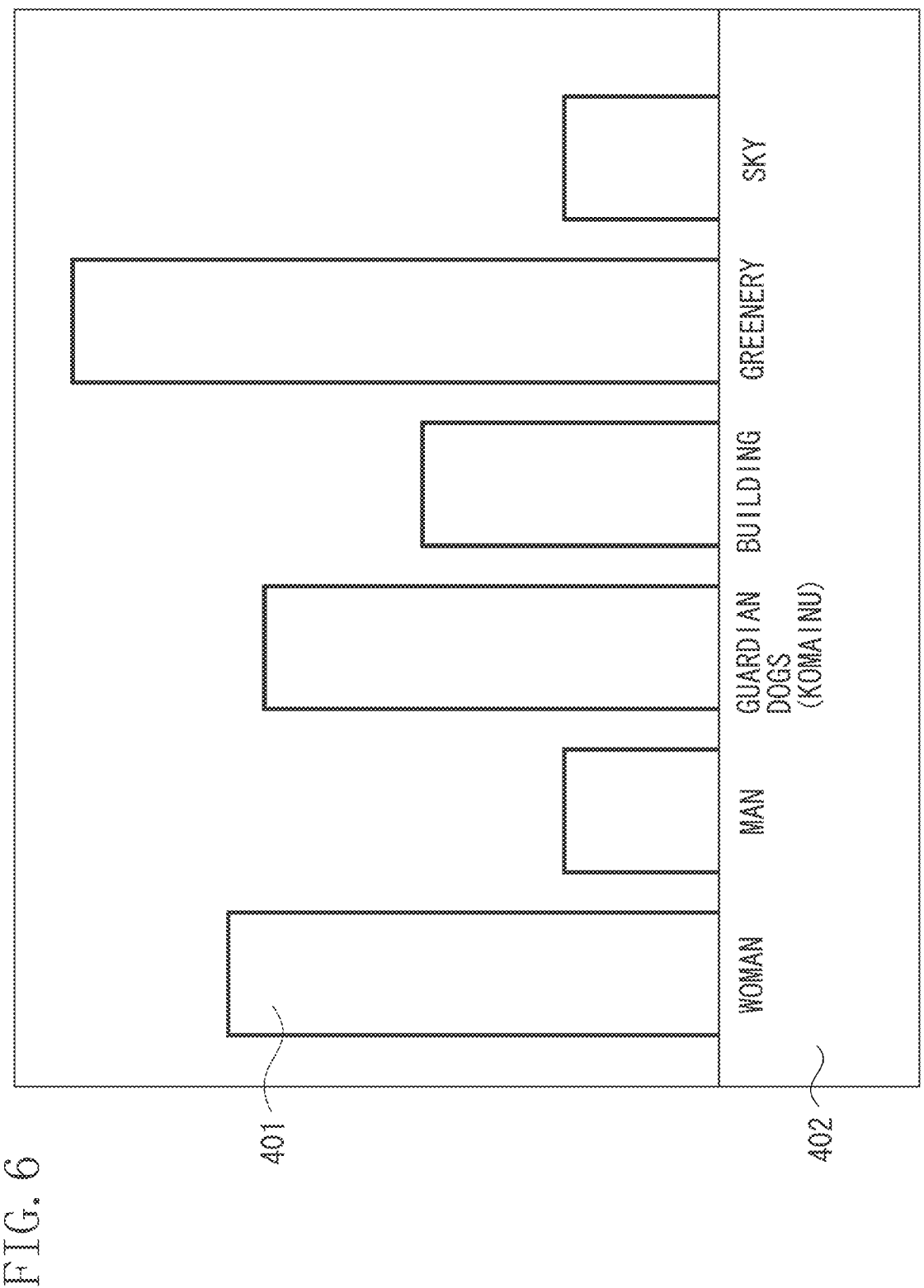
FIG. 6 is a graph illustrating an example of a frequency distribution display screen.

FIG. 6 is a graph illustrating an example of a frequency distribution display screen. In FIG. 6, a bar graph 401 expresses a frequency of capturing an image of each "subject" and a name 402 expresses the image-captured "subject" in the form of a text. What is displayed on the display screen at a time is a part of the "subject". The photographer can confirm the image capturing frequency of the entire "subject" which the photographer captured an image thereof by scrolling the displayed portion. After completion of the processing in step S602, the processing proceeds to step S603.

In step S603, the desired object registration unit 108 updates the desired object information as information indicating what type of object is desired by the photographer.

The determination of what type of the object is desired by the photographer is made according to the following steps. Basically, the desired object registration unit 108 determines the object that the photographer frequently captures an image thereof as what the photographer desires as the object. However, the desired object registration unit 108 does not determine the object that is too typically image-captured by everybody, e.g., a "man", a "woman", and "greenery", as the object that the photographer desires, even if the photographer often captures an image of such an object.

A Term Frequency-Inverse Document Frequency (TF-IDF) method is used in the present exemplary embodiment as a method for satisfying the above idea. The TF-IDF method is typically used in an information search or a field of sentence summarization.

In the present exemplary embodiment, the Term Frequency (TF) is calculated by using the following equation.

$tf(t)$=number of occurrences of the specific subject $t$ in all the captured images captured by the photographer/total number of the "subjects" recognized in all the captured images captured by the photographer where t is a specific "subject" such as a "guardian dog (komainu)".

The Inverse Document Frequency (IDF) is calculated by using the following equation.

$idf(t)$=1+$ln$(total number of photographers who use the information sharing server/number of photographers who have had a chance to capture an image of the specific subject $t$ among all the photographers)

In a case where a result of multiplication of tf(t) and idf(t) is equal to or larger than a certain value, such a result can be considered as the object that satisfies the basic idea and that the photographer desires to capture an image thereof, i.e., as the desired object.

At the time of the above calculation, a value of the IDF may be obtained via communication with the information sharing server. Alternatively, the value of the IDF at a predetermined time may be recorded in the imaging apparatus. In consideration of a trend gap of the objects according to local areas, different IDFs may be prepared for countries and areas by limiting them according to their location, and thereby the IDF of an area to which the photographer belongs may be used.

In the present exemplary embodiment, the desired object is determined by using the TF-IDF method. However, the desired object maybe determined by using another desired object determination method. A type determination method is described below as an example of the desired object determination method which can be used in addition to the above method.

Among the photographers who capture images by using a camera, some have a typical preference, i.e., some photographers are "railway fans", "animal lovers", or "hiking lovers". In the type determination method, an ad-hoc determination equation is prepared for the respective typical preferences. For example, a photographer is determined as the "railway fan" based on, for example, a fact that the photographer "captures more than a single piece of image in which a train is contained but a person is not contained in a hundred pieces of images".

As described above, the ad-hoc determination equation is preliminary recorded in the imaging apparatus to determine each determination method by the desired object registration unit 108. Thereby in which type the photographer having the imaging apparatus belongs to and what kind of object the photographer desires can be determined. The determination may be made in such a manner that the photographer belongs to a plurality of types or the photographer does not belong to any type.

How to update the desired object information in step S603 is described above. After completion of the processing of step S603, the processing proceeds to step S604.

In step S604, the control unit 105 adds information to the image data having been captured and recorded. In this process, the latitude information, the longitude information, and the height information detected by the position detection unit 103 and information of the object recognized by the image recognition unit 106 are added to the image data in the form of text information. After completion of the processing of step S604, the processing proceeds to step S605.

In step S605, the wireless communication unit 104 transmits the image data, to which the latitude information, the longitude information, the height information, and the text information are added, to the information sharing server via the wireless communication network.

The flow of the processing performed by the imaging apparatus after the image capturing processing in the present exemplary embodiment is described above with reference to the drawings.

In step S601, the information of the image automatically captured is extracted according to the image recognition processing. However, it is not limited thereto, and the extraction may be executed according to the text input processing of the photographer. In the update of the desired object information of step S603, the desired object may not always be determined automatically but may be determined by the text input processing of the photographer or input processing from among options.

How the image data transmitted from the imaging apparatus is processed after the image data is transmitted to the information sharing server will be described below.

Figure 7:
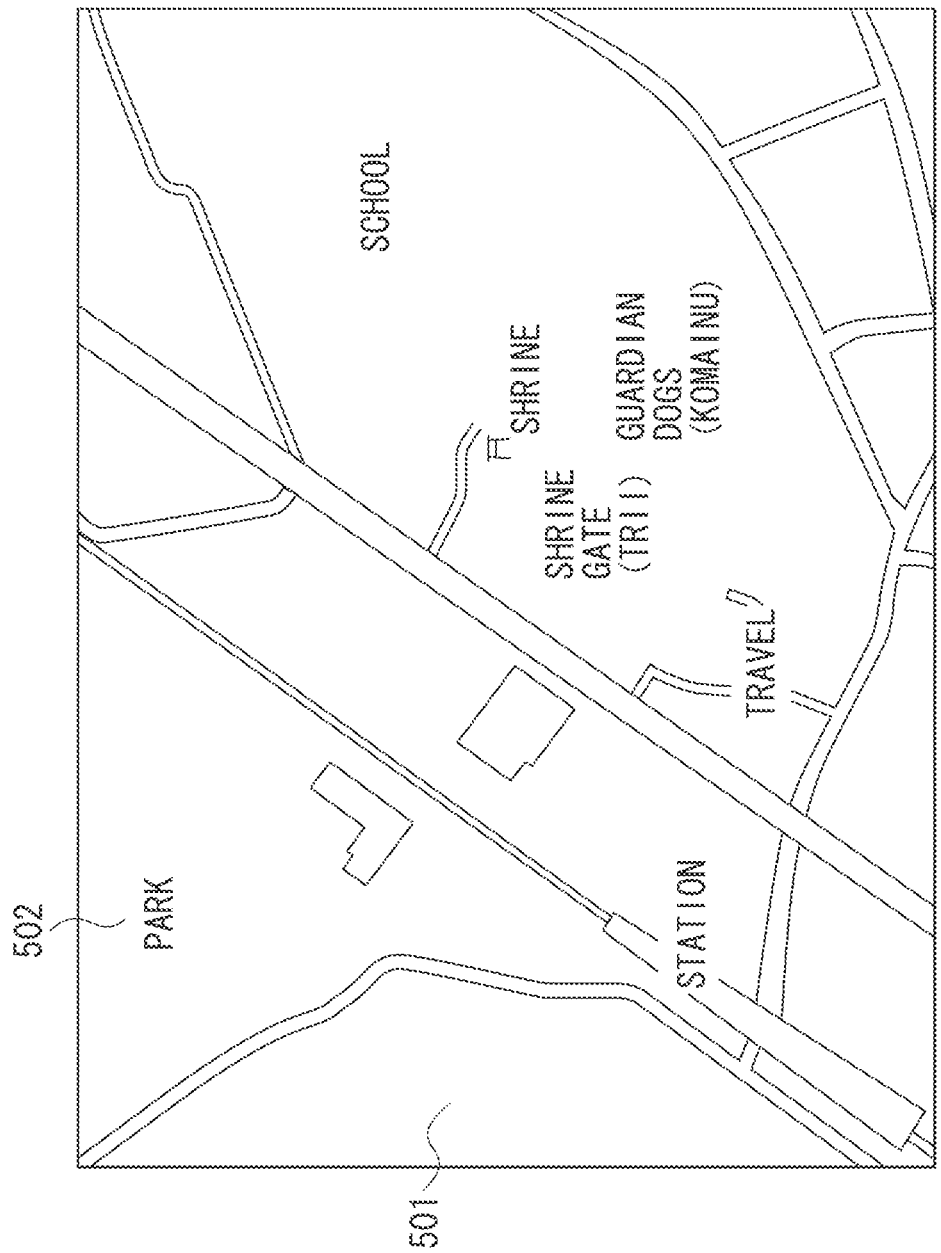
FIG. 7 illustrates an example of a frequency map.

The information sharing server stores the images transmitted from the plurality of photographers in the data storage unit 202. The information sharing server generates such a frequency map as illustrated in FIG. 7 by using the stored image data and map data. In a map 501 of FIG. 7, a name 502 represents the object on the map, of which image is often captured, in the form of a text.

The size of the text represents the frequency. That is, the larger the font becomes, the more times an image of the object is captured. The frequency map is presented to a computer connected to the information sharing server via the internet.

In the present exemplary embodiment, the frequency map is generated by using a method described in L. Kennedy, M.

Naaman, S. Ahern, R. Nair and T. Rattenbury "How Flickr helps us make sense of the world: Context and content in community-contributed media collections", Proc. ACM Multimedia, 2007 . Another method may also be used as long as an equivalent result can be obtained by the method.

Figure 8:
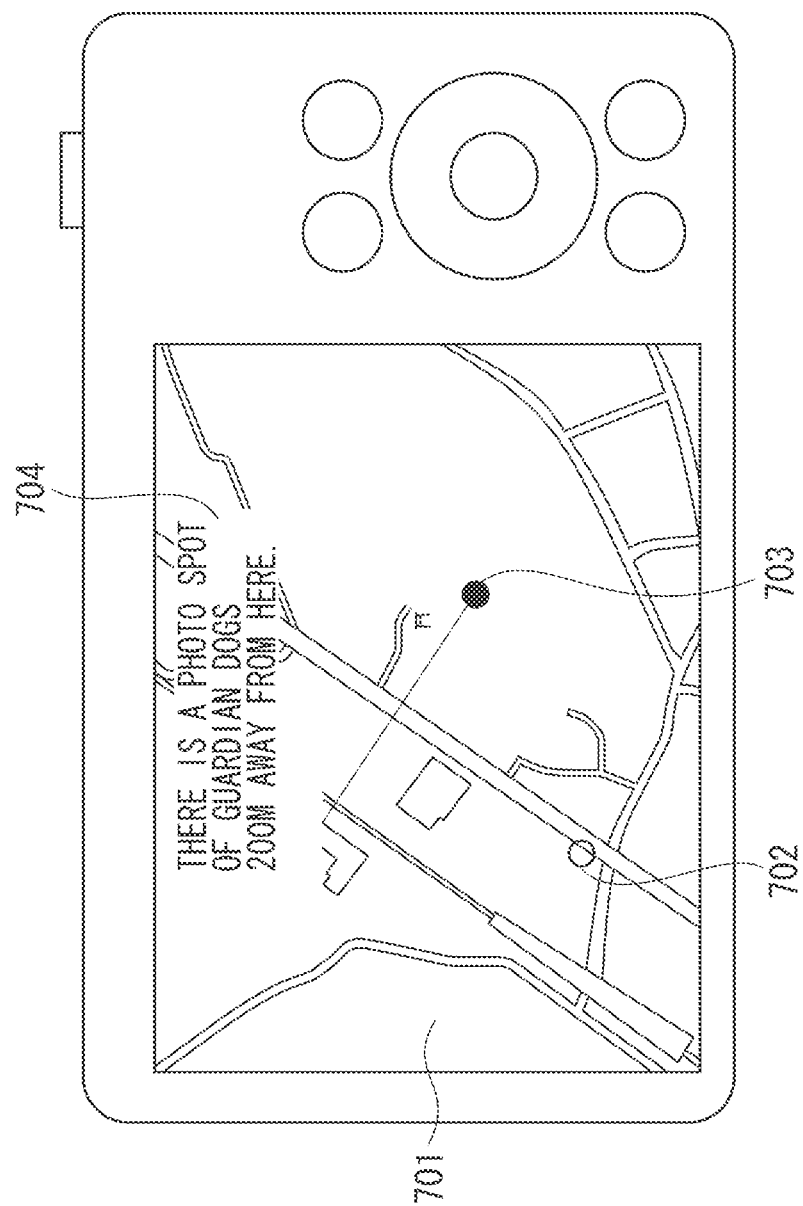
FIG. 8 illustrates an example of displaying a desired object.

In the present exemplary embodiment, in a case where the photographer carries the imaging apparatus and sets the imaging apparatus to such a mode that a proposal of the adjacent target object can be received and in a case where there is the desired object around the photographer, a display illustrated in FIG. 8 is made on the imaging apparatus. In FIG. 8, a current position 702 and a position 703 at which the desired object exists are shown in an adjacent map 701. A text 704 represents a content of the desired object and a distance to the object from the current position 702.

How to process the display of the adjacent desired object is described below with reference to a flow chart of FIG. 9. The processing is realized by a cooperative operation between the imaging apparatus and the information sharing server.

Figure 9:
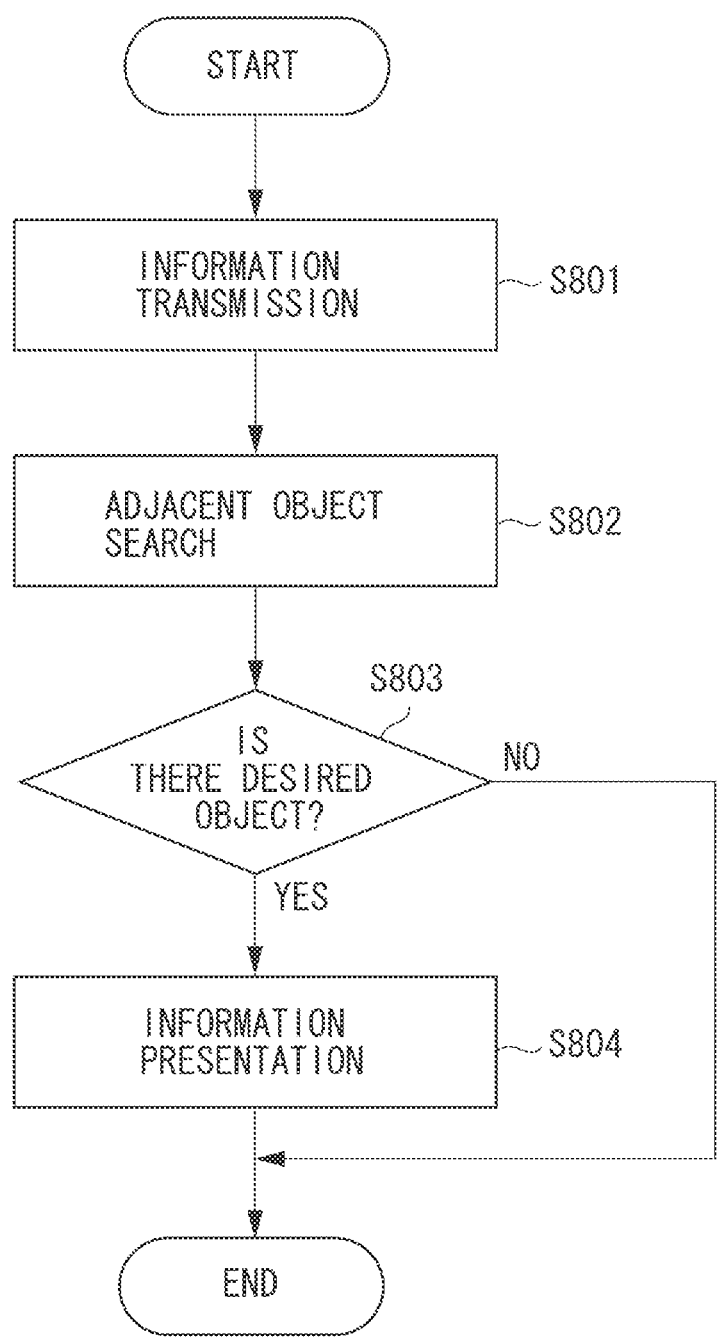
FIG. 9 is a flow chart illustrating an example of processing of displaying the desired object.

In a case where the photographer sets the imaging apparatus to such a mode that the proposal of the target object existing around the photographer can be received, the adjacent object presenting processing of FIG. 9 is executed at regular time intervals. In the present exemplary embodiment, the processing of FIG. 9 is executed at a frequency of once in a minute, in a case where an acceleration meter (not illustrated) built-in the imaging apparatus is measuring a change of a rate of acceleration, i.e., in a case where it is assumed that the imaging apparatus is moving.

When the adjacent object proposal processing is started, in step S801, the position detection unit 103 carries out measurement of the current position of the imaging apparatus. The position detection unit 103 transmits the measured position information to the information sharing server via the wireless communication unit 104 together with the desired object information registered in the desired object registration unit 108. After completion of the processing of step S801, the processing proceeds to step S802.

In step S802, the information sharing server performs a search of the adjacent candidate object. The search of the adjacent candidate object is executed by the candidate object determination unit 204. In the present exemplary embodiment, the candidate object determination unit 204 searches whether there exists an object which the photographer desires to capture an image thereof within a range less than 1 km around the current position of the photographer on the frequency map of FIG. 7 displaying an area around the position transmitted from the photographer. After completion of the processing of step S802, the processing proceeds to step S803. The range less than 1 km around the current position of the photographer is a mere example of a search range.

In step S803, the control unit 203 determines whether the desired object is obtained by the search based on the search result of step S802. In a case where the desired object is obtained by the search (YES in step S803), the processing proceeds to step S804. In a case where the desired object is not obtained by the search (NO in step S803), the processing of FIG. 9 is ended.

In step S804, the information sharing server transmits thus obtained candidate object information to the imaging apparatus. Upon receiving the candidate object information, the imaging apparatus displays the adjacent candidate object as illustrated in FIG. 8. Then, the processing is ended.

At the time, the map illustrated in FIG. 8 is transmitted from the information sharing server. However, the imaging apparatus may contain map data therein to use the data in drawing a map. As the method of presenting the candidate object information to the photographer, a method in which a direction and a distance from the current position of the imaging apparatus to the object image is described in the text form may be employed instead of the method in which the position of the object is displayed on the map. Another method of presenting the candidate object information to the photographer may be a method of outputting the text via voice.

In step S802, the object is searched within the range of 1 km around the photographer. However, the range may be changed depending on a determination how the photographer is moving. For example, in a case where it is estimated that the photographer is moving by using a car based on the detected position information of the photographer, the search range may be extended to, for example, 10 km around the current position of the photographer. Alternatively, in a case where it is estimated that the photographer is on a train based on a mobile history contained in the position information of the photographer, the search maybe conducted around an area along a railway in a travelling direction of the train.

In the processing of step S802, a degree of recommendation maybe changed according to how much the object is desired by the photographer or according to a distance to the candidate object. With the above method, in a case where the more the photographer desires and in a case where the more number the candidate objects exists around the photographer, the higher the degree of recommendation to the photographer can be made.

An example of a method which realizes this include a method in which, provided that p is a spot searched in step S802, a recommendation degree R(p) is calculated by using the following equation.

$$R(p) = \text{desired degree } D(p)/(\text{square of a distance between the current position and the } R(p))$$

where the desired degree D (p) is an index representing how much the candidate object existing at the spot p is desired by the photographer and can be determined in the course of the processing of step S603.

In a case where the recommendation degree R(p) is calculated in this way and, as a result thereof, a plurality of candidate objects are searched, in step S804, the candidate objects are displayed in the order from the candidate object having a higher recommendation degree R (p). As a result thereof, the adjacent candidate object more desired by the photographer can be preferentially recommended to the photographer.

In the processing of step S802, the search range may be designated not only by a range of space but also by a range of time. For example, by reflecting only the image data transmitted to the information sharing server within a year in the search, older data can be excluded, i.e., the search of the candidate objects can be conducted by using newer information.

In the scenic spots, candidate objects suitable even for a case where the scenery changes according to the seasons, e.g., because of the autumn leaves, can be presented by reflecting only the image data captured in the same season to the search. Further, if the last 30 minutes is designated as the search range, for example, in a case where an image of an artist was captured in these days somewhere in the vicinity thereof, the photographer can receive such information.

The configurations of the imaging apparatus and the information sharing server and how the imaging apparatus and the information sharing server operate are described above in the present exemplary embodiment. With the use of the imaging apparatus according to the present exemplary embodiment, the photographer can know a position of a preferable candidate object around the photographer via the imaging apparatus.

The present exemplary embodiment is configured in such a manner that the image recognition processing is carried out on the imaging apparatus. However, in addition to the above configuration, the present exemplary embodiment may be configured to include an image recognition unit on the information sharing server, thereby carrying out the image recognition processing on the information sharing server and transmitting the result of the image recognition processing to the imaging apparatus. Alternatively, the present exemplary embodiment may be configured in such a manner that the image-capturing trend recording unit 107 and the desired object registration unit 108 are provided, not to the imaging apparatus, but to the information sharing server.

A second exemplary embodiment is described below. In the second exemplary embodiment, a case where the image recognition unit 106 which is provided and operating in the imaging apparatus of the first exemplary embodiment is provided not in the imaging apparatus but in the information sharing server to be executed thereon is described.

FIG. 10A is a block diagram illustrating a configuration of an imaging apparatus of the present exemplary embodiment. FIG. 10B is a block diagram illustrating a configuration of an information sharing server of the present exemplary embodiment. Unlike the first exemplary embodiment, the image recognition unit 106 is provided in the information sharing server. Each unit operates in a similar manner to the corresponding unit of the first exemplary embodiment.

An operation performed after capturing an image of the second exemplary embodiment differs from that of the first exemplary embodiment. Steps S601 through S605 are executed in this order in the first exemplary embodiment, whereas the operation performed after capturing an image is executed in the order of S604, S605, S601, S602, and S603 in the second exemplary embodiment.

In the present exemplary embodiment, in step S601, the image recognition processing is carried out by the image recognition unit 106 in the information sharing server, and a result of the image recognition processing is transmitted to the imaging apparatus via the communication unit 201. Since the other portions are identical to the corresponding ones of the first exemplary embodiment, descriptions thereof are omitted here.

A third exemplary embodiment is described below. In the third exemplary embodiment, a case where the image recognition unit 106, the image-capturing trend recording unit 107, and the desired object registration unit 108 which are provided and operating in the imaging apparatus in the first exemplary embodiment are provided and operating not in the imaging apparatus but in the information sharing server is described.

Figure 11B:
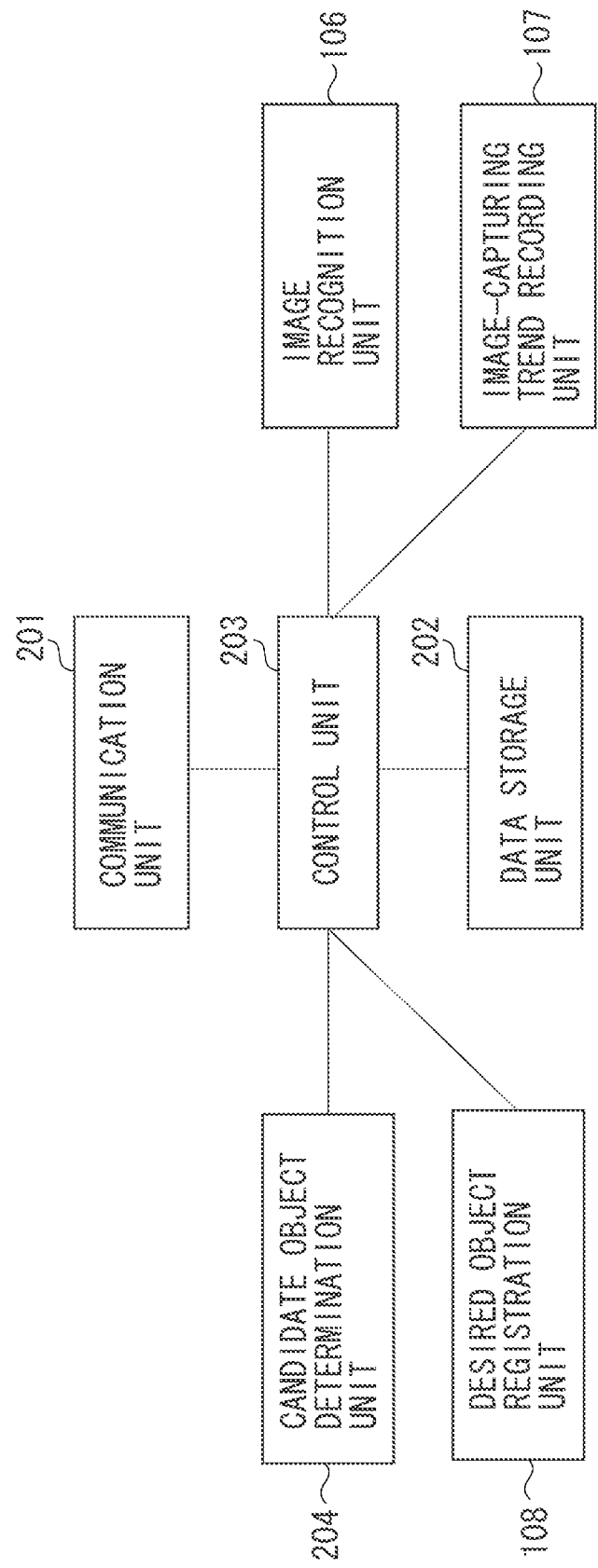
FIG. 11B illustrates a functional configuration of an information sharing server according to the third exemplary embodiment.

FIG. 11A is a block diagram illustrating a configuration of an imaging apparatus of the third exemplary embodiment. FIG. 11B is a block diagram illustrating a configuration of an information sharing server of the third exemplary embodiment. Unlike the first exemplary embodiment, the image recognition unit 106, the image-capturing trend recording unit 107, and the desired object registration unit 108 are provided in the information sharing server. Each unit operates in a similar manner to the corresponding unit of the first exemplary embodiment. The image-capturing trend recording unit 107 and the desired object registration unit 108 can record the image-capturing trend and the desired object of each of the photographers (i.e., users) of the imaging apparatus to be connected to the information sharing server distinctively for each photographer.

An operation performed after capturing an image of the third exemplary embodiment differs from that of the first exemplary embodiment. Steps S601 through S605 are executed in this order in the first exemplary embodiment, whereas the operation performed after capturing the image is executed in the order of S604, S605, S601, S602, and S603 in the third exemplary embodiment. In the third exemplary embodiment, steps S601, S602, and S603 are executed on the information sharing server, and the image-capturing trend information and the desired object information are stored in the information sharing server together with ID information to be used to identify the imaging apparatus.

Display processing of the desired object of the third exemplary embodiment differs from that of the first exemplary embodiment. The flow of processing from steps S801 through S804 is identical to that of the first exemplary embodiment, except that the position information and the ID information to be used to identify the imaging apparatus are transmitted to the information sharing server in step S801 in the third exemplary embodiment. In step S802, the desired object information corresponding to the ID information to be used to identify the imaging apparatus is extracted from the ID information, and presence or absence of the adjacent candidate object is determined. Since the other portions are identical to the corresponding ones of the first exemplary embodiment, descriptions thereof are omitted here.

A fourth exemplary embodiment is described below. In the fourth exemplary embodiment, a case where the image-capturing trend recording unit 107 and the desired object registration unit 108 which are provided and operating in the imaging apparatus in the first exemplary embodiment are provided and operating not in the imaging apparatus but in the information sharing server is described.

Figure 12A:
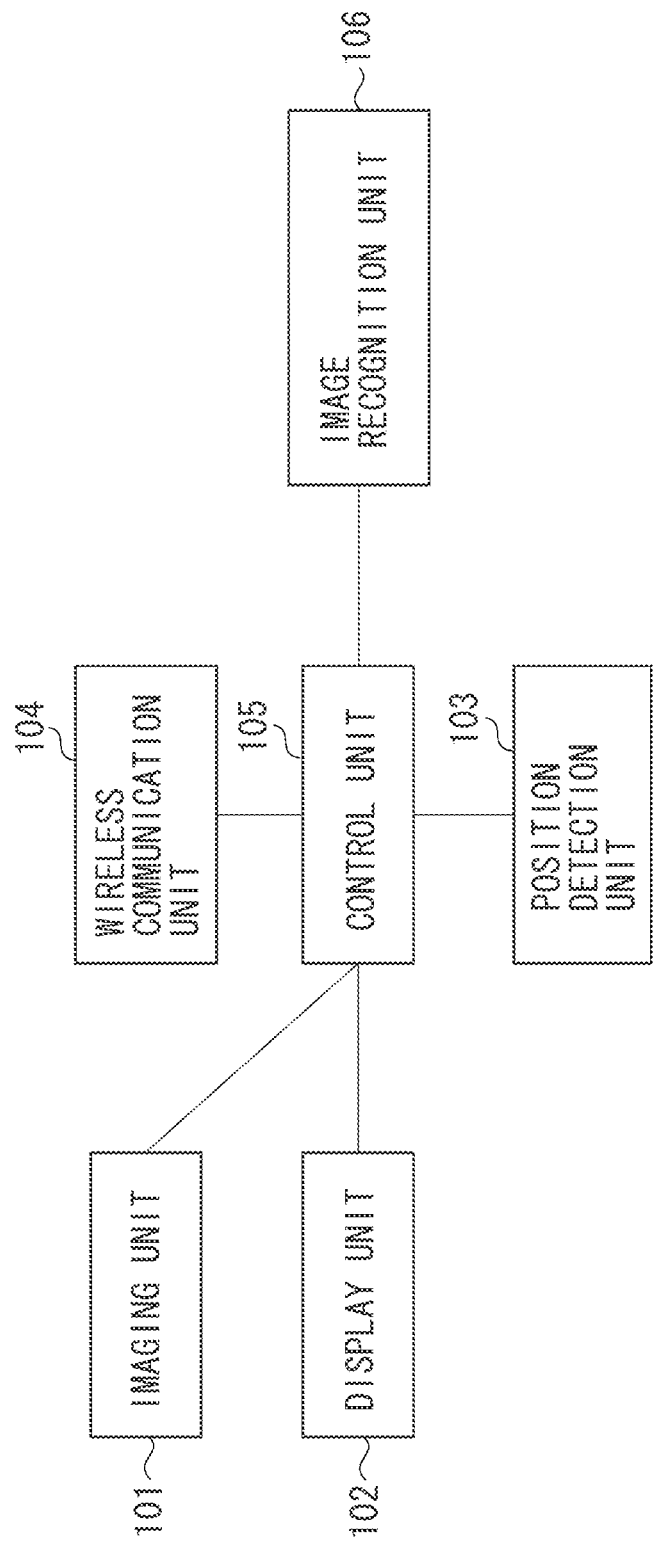
FIG. 12A is a block diagram illustrating a functional configuration of an imaging apparatus according to a fourth exemplary embodiment.

FIG. 12A is a block diagram illustrating a configuration of an imaging apparatus of the present exemplary embodiment. FIG. 12B is a block diagram illustrating a configuration of an information sharing server according to the present exemplary embodiment. Unlike the first exemplary embodiment, the image-capturing trend recording unit 107 and the desired object registration unit 108 are provided in the information sharing server. Each unit operates in a similar manner to the corresponding unit of the first exemplary embodiment. The image-capturing trend recording unit 107 and the desired object registration unit 108 can record the image-capturing trend and the desired object of each of the photographers of the imaging apparatus to be connected to the information sharing server distinctively for each photographer.

An operation performed after capturing an image of the fourth exemplary embodiment differs from that of the first exemplary embodiment. Steps S601 through S605 are executed in this order in the first exemplary embodiment, whereas the operation performed after capturing an image is executed in the order of S601, S604, S605, S602, and S603 in the fourth exemplary embodiment. In the fourth exemplary embodiment, steps S602 and S603 are executed on the information sharing server and the image-capturing trend information and the desired object information are stored in the information sharing server together with the ID information to be used to identify the imaging apparatus.

Display processing for displaying the desired object of the fourth exemplary embodiment differs from that of the first exemplary embodiment. The flow of the processing performed in steps S801 through S804 is identical to that of the first exemplary embodiment, except that the position information and the ID information to be used to identify the imaging apparatus are transmitted to the information sharing server in step S801 in the fourth exemplary embodiment.

In step S802, desired object image information corresponding to the ID information to be used to identify the imaging apparatus is extracted from the ID information and presence or absence of an adjacent candidate object is determined. Since the other portions are identical to the corresponding ones of the first exemplary embodiment, descriptions thereof are omitted here.

A fifth exemplary embodiment is described below. In the fifth exemplary embodiment, a configuration in which all the functions of the information sharing server are contained in the imaging apparatus is described. FIG. 13 is a block diagram illustrating a configuration of an imaging apparatus according to the fifth exemplary embodiment. Unlike the first exemplary embodiment, all the functions of the information sharing server are integrated in the imaging apparatus in the fifth exemplary embodiment.

An operation performed after capturing an image of the fifth exemplary embodiment differs from that of the first exemplary embodiment. That is, processing of the data transmission of step S605 is not executed in the fifth exemplary embodiment. Display processing for displaying the desired object of the fifth exemplary embodiment differs from that of the first exemplary embodiment, so that the processing of step S801 is not executed. In the above described processing, a data transmission is not performed but all the processing is performed within the imaging apparatus.

Each imaging apparatus includes a data storage unit and holds not only images captured by the photographer of the imaging apparatus but also images captured by other photographers. Update of the stored data is carried out via an intermittent peer-to-peer (P2P) communication with the other similar imaging apparatus.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided in the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-260275 filed Nov. 29, 2011, which is hereby incorporated by reference herein in its entirety.

What is claimed is:

1. An imaging apparatus, comprising:
    an imaging unit;
    a position detection unit configured to detect position information of the imaging apparatus;
    an acquisition unit configured to acquire candidate object information indicating an object which a photographer may desire to capture an image thereof within a search range of position information based on the position information detected by the position detection unit;
    a display unit configured to display a map on the basis of the position information detected by the position detection unit;
    a presenting unit configured to present the candidate object information on the map displayed by the display unit to the photographer;
    a recording unit configured to record image-capturing trend information indicating an image capturing trend of the imaging unit; and
    a determination unit configured to determine desired object information of an object which the photographer desires to capture an image thereof based on the image-capturing trend information recorded by the recording unit,
    wherein the object which the photographer desires is calculated to take into consideration a frequency at which the object is captured by other photographers.

2. The imaging apparatus according to claim 1,
    wherein the acquisition unit includes,
        a transmission unit configured to transmit the position information detected by the position detection unit to a server apparatus; and
        a receiving unit configured to receive the candidate object information indicating the object which the photographer may desire to capture the image thereof within the search range of the position information from the server apparatus.

3. The imaging apparatus according to claim 1,
    wherein the acquisition unit includes,
        a transmission unit configured to transmit the position information detected by the position detection unit and the desired object information indicating the object which the photographer desires to capture the image thereof to the server apparatus; and
        a receiving unit configured to receive the candidate object information indicating an object which the photographer may desire to capture the image thereof within the search range of the position information, which is determined based on the position information and the desired object information from the server apparatus.

4. The imaging apparatus according to claim 3, further comprising:
    a registration unit configured to register information indicating the object determined by the determination unit as the desired object which the photographer desires to capture an image thereof as the desired object information.

5. The imaging apparatus according to claim 1, wherein the presenting unit displays the candidate object information on a display unit.

6. The imaging apparatus according to claim 1, wherein the acquisition unit generates information indicating the object corresponding to the desired object information within the search range of the position information as the candidate object information based on the position information detected by the position detection unit and the desired object information indicating an object which the photographer desires to capture an image thereof.

7. The imaging apparatus according to claim 6, further comprising:
    a registration unit configured to register information indicating the object which the determination unit determines as the object the photographer desires to capture an image thereof as the desired object information.

8. The imaging apparatus according to claim 7, further comprising:
- a storage unit configured to store the image data in which the position information detected by the position detection unit and object information of an object in the image are added to the image captured by the imaging unit; and
- a generation unit configured to generate a frequency map based on the stored image data and map data;
- wherein the acquisition unit searches the frequency map based on the position information and the desired object information to acquire candidate object information indicating the object corresponding to the desired object information within the search range of the position information.

9. A presenting method used in an imaging apparatus including an imaging unit, the method comprising:
- detecting position information of the imagining apparatus;
- acquiring candidate object information indicating an object which a photographer may desire to capture an image thereof within a search range of position information based on the detected position information;
- displaying a map on the basis of the detected position information;
- presenting the candidate object information on the map to the photographer;
- recording image-capturing trend information indicating an image capturing trend of the imaging unit; and
- determining desired object information of an object which the photographer desires to capture an image thereof based on the image-capturing trend information recorded,
- wherein the object which the photographer desires is calculated to take into consideration a frequency at which the object is captured by other photographers.

10. A non-transitory computer-readable storage medium configured to store a program for causing a computer including an imaging unit to execute a method comprising:
- detecting position information of the computer;
- acquiring candidate object information indicating an object which a photographer may desire to capture an image thereof within a search range of position information based on the detected position information;
- displaying a map on the basis of the detected position information;
- presenting the candidate object information on the map to the photographer;
- recording image-capturing trend information indicating an image capturing trend of the imaging unit; and
- determining desired object information of an object which the photographer desires to capture an image thereof based on the image-capturing trend information recorded,
- wherein the object which the photographer desires is calculated to take into consideration a frequency at which the object is captured by other photographers.

11. The imaging apparatus according to claim 1, wherein the object which the photographer desires is calculated to further take into consideration how the photographer is moving.

12. The imaging apparatus according to claim 11, wherein the object which the photographer desires is calculated to take into consideration a travelling direction of a train, in a case where it is estimated that the photographer is on the train.

* * * * *